Feb. 14, 1967   W. OFFENBACHER   3,303,980
EDGE SNAPPING DEVICE

Filed June 28, 1965   2 Sheets-Sheet 1

Inventor
Wendel Offenbacher
By Cushman, Darby & Cushman
Attorneys

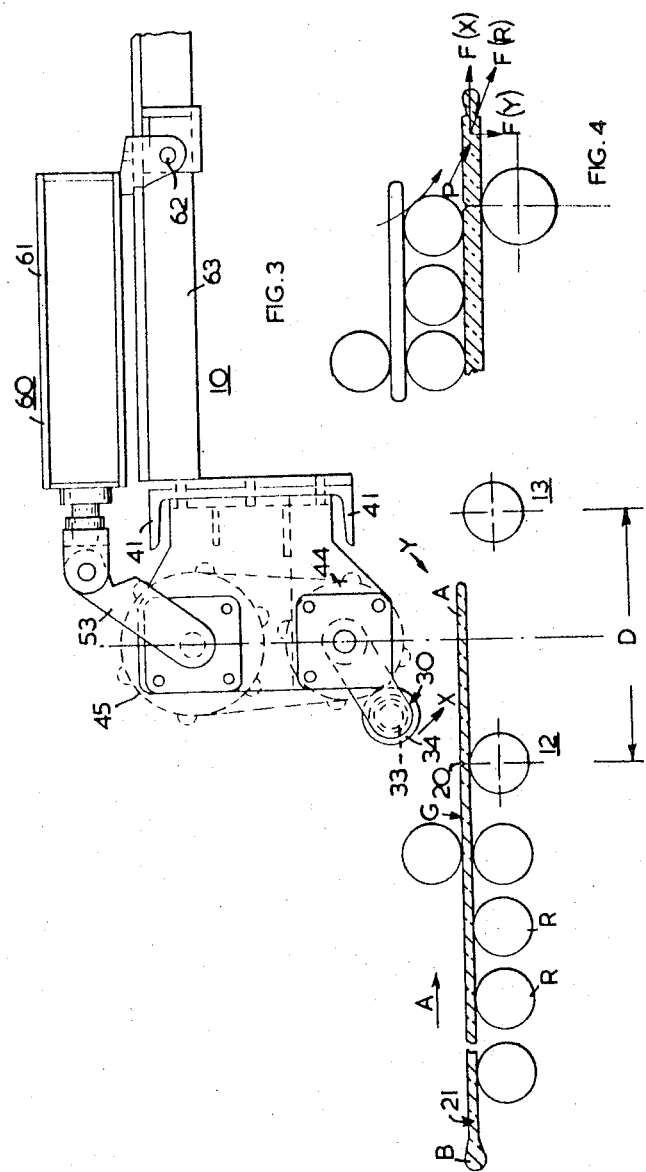

United States Patent Office 3,303,980
Patented Feb. 14, 1967

3,303,980
EDGE SNAPPING DEVICE
Wendel Offenbacher, St. Laurent, Quebec, Canada, assignor to Pittsburgh Plate Glass Company, Pittsburgh, Pa.
Filed June 28, 1965, Ser. No. 467,221
Claims priority, application Canada, May 11, 1965, 930,365
10 Claims. (Cl. 225—2)

This invention relates to improved glass snapping apparatus for removing edge portions from a sheet of glass while the latter is moving.

In manufacturing glass sheets, a continuous ribbon is drawn from a molten bath and sheets of selected size are sequentially removed from the advancing forward edge, such sheets being of a width equal to that of the ribbon drawn. Edge rollers grasp the ribbon adjacent the marginal edges thereof during the drawing operation and this results in either a bulbuous or grooved edge dependent upon the type of rollers used. The rollers damage the edge and such damaged portions generally are removed before the sheets are further divided into various shapes and sizes.

During the glass drawing operation, cutting apparatus scores the ribbon along parallel score lines adjacent the marginal edges inwardly toward the center of the sheet from the damaged edge portion. The individual sheets of glass, severed from the ribbon, are oriented on a conveyor such that the score lines are disposed normal to the direction of travel of the conveyor. The edges to be removed thus are located at the leading and trailing edge of a sheet moving unidirectionally. For convenience of description, these damaged marginal edge portions will hereinafter be referred to as the leading and trailing edge.

The term edge as used herein does not mean the dimension normal to the surface of the sheet of glass but rather a relatively small, narrow area of the sheet disposed along the margin of the sheet.

The conveyor moves the sheets along a selected path bringing the leading and trailing edges in sequence into alignment with a striker and anvil. The damaged edge portions are thus removed by being struck an appropriate blow at an appropriate time and position. The apparatus for removing the edge portions will be referred to herein as an edge snapping device.

To remove a portion from a sheet of glass without substantial damage to the severed edges, it is desirable to prevent contact of such adjacent severed edges immediately upon severance and this separation has long been realized, as exemplified by United States Patent 2,052,243, issued August 25, 1936. In this patent, there is disclosed apparatus for severing a sheet of glass into several pieces and the sheet to be severed is conveyed by a first conveyor into alignment with a hammer and anvil and the pieces severed therefrom are deposited on a second conveyor travelling at a greater speed than that of the first. The faster rate of travel of the second conveyor maintains the plurality of severed pieces in spaced relation on the second conveyor. In this patented structure, the striker moves in a direction generally normal to the surface of the sheet of glass and, accordingly, the portion being severed from a sheet of glass is struck with a blow having a component of force substantially normal to the plane surface of the glass sheet. In order to prevent contact of the adjacent severed edges, the conveyor is intermittently interrupted so that the sheet of glass is stopped in motion each time it is struck a blow by the hammer. The disadvantages of intermittent operation are obvious.

United States Patent 3,072,308 is an example of glass snapping apparatus where the sheet of glass moves continuously but again in this structure the hammer or striker travels in a direction substantially normal to the plane of the sheet of glass. This apparatus is satisfactory and would perform a clean break at the trailing edge of a moving sheet of glass where by virtue of the motion of the sheet, the striking force has a tendency to retard the movement of the portion being severed and thus, separate it from the remaining portion of the sheet. This, however, would not be true for leading edge since the severed pieces would be retarded and thus, aggravate interference between the adjacent severed edges.

In most known glass snapping devices, the striker, as in the patented structures aforementioned, travels in a direction substantially normal to the plane of the sheet of glass. By virtue of this motion, the pieces of glass being severed from the sheet are struck with a blow having only a component of force normal or substantially normal to the plane of the sheet.

It is an object of the present invention to provide an apparatus for severing a portion from a moving sheet of glass wherein the portion to be severed is struck with a blow having a resultant component of force disposed at an angle with respect to the plane of the sheet of glass and in a direction away from the remaining portion of the sheet.

According to the present invention, there is provided a glass snapping device having a support for a sheet of glass, an anvil engageable with one surface of the latter and a striker selectively engageable with the opposed surface of said sheet adjacent and to one side of said anvil, said striker having a direction of travel disposed at an angle with respect to the plane of the sheet to provide components of force in the struck portion both in a direction normal and parallel to the plane sheet, the latter component being directed away from the anvil and thereby tending to separate the adjacent severed edges of glass to remove the severed portion from the remaining portion of the sheet.

In a further aspect the invention relates to the method and apparatus for sequentially removing the leading and trailing edge from a glass sheet during movement of the latter along a selected path by striking the edge to be removed a blow to provide in the removed portion a component of force such as to separate the removed portion from the remaining portion of the sheet.

The invention is illustrated by way of example in the accompanying drawings wherein:

FIG. 3 is a right-hand side elevational view of FIG. 1; and

FIG. 4 is a vertical, sectional view of a portion of a sheet of glass illustrating the components of force in a piece struck by a striker in accordance with the present invention.

Figure 1:
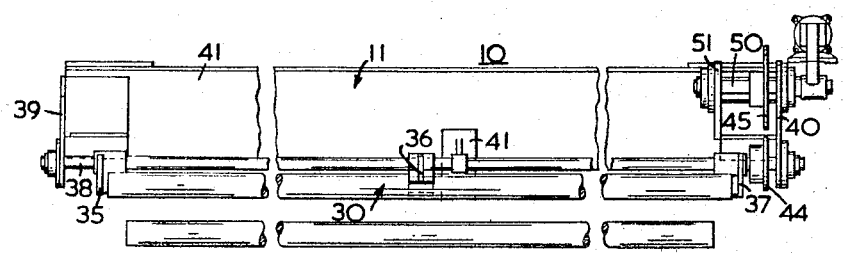
FIG. 1 is a front elevational view of an edge glass snapping device constructed in accordance with the present invention.
Figure 2:
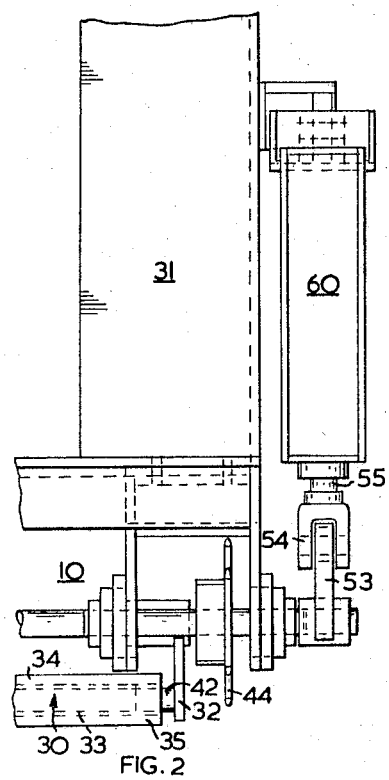
FIG. 2 is a top plan view of FIG. 1.

Referring now in detail to the drawings, shown therein is a glass edge snapping device consisting of a striker assembly 10 disposed vertically above a conveyor 11 and further located adjacent and horizontally between a pair of anvils 12 and 13.

The conveyor 11 consists of a plurality of rollers R adapted to support a series of horizontally disposed sheets of glass and secured to a suitable frame work (not shown). The rollers are located side-by-side with selected ones or all of the same driven to convey the sheets of glass in the direction of arrow A only one sheet G being shown.

The anvils 12 and 13 consist of a freely rotatable roller with the upper edge thereof in alignment with the upper edge of the rollers R. The pair of anvils 12 and 13 are disposed in spaced relation intermediate a pair of adjacent rollers R and the anvils are spaced apart a selected distance from one another to provide an escape path therebetween, as will be seen hereinafter, for the edge portions removed from the sheet of glass G.

The sheet of glass G is conveyed in a horizontal position uninterrupted past the snapping device and the sheet includes a leading edge A and a trailing edge B, the respective areas being defined and separated from the remaining portion of the sheet by parallel grooves 20 and 21. These grooves are as previously mentioned, made by a cutting apparatus during drawing of the ribbon from the molten bath.

The grooves 20 and 21 are located in the upper surface of the sheet as it is conveyed to the snapping device by the conveyors and are disposed normal to the direction of travel. These grooves are located at various distances from the edge of the sheet dependent upon the type of edge rollers or pullers utilized during drawing of the ribbon from the bath.

The edge snapping device includes a striker 30 secured to a frame 31 and mounted to oscillate about a horizontal axis. The striker is essentially an elongated bar disposed normal to the direction of travel of the sheet of glass G and is disposed vertically thereabove intermediate the anvils 12 and 13. The bar consists of a steel tube 33 having an annular jacket or cover 34 of rubber or other resilient material which has a relatively high-co-efficient of friction relative to glass. The bar is secured to the frame by spaced substantially parallel arms, 35, 36 and 37 secured to a rod 38 which is journalled at its opposed ends in respective end plates 39 and 40 and an intermediate support 41. The end plates and intermediate support are secured to and project from a channel member 41, the latter of which is is portion of the frame 11.

The arms 35 and 37 include a hub portion 42 projecting therefrom adjacent the opposed ends and these hubs are inserted into the ends of the tube. The arm 36 may be secured to the tube in any convenient manner for example, as by welding or the like on a portion of the surface which does not engage or contact the sheet of glass. The rod 38, mounted for rotation, has the arms keyed thereto and may be driven by a chain 43 traversing driven and drive gears 44 and 45 secured respectively to the shaft 38 and a drive shaft 50. The drive shaft 50 is journaled for rotation in the plate 40 and in a further plate 51 in spaced relation with respect thereto. One end of the shaft 50 projects beyond the plate 40 and rigidly connected thereto is an arm 53. The free end of the arm extending from the shaft is pivotally connected by a pin 54 to the movable shaft 55 of a pneumatic cylinder assembly 60.

From FIG. 3, it will be noted the gear 45 is substantially larger in diameter than the gear 44 and this ratio of gear size may be preselected to provide a proper angle of arcuate movement of the striker in response to a selected length of travel of the piston shaft of the pneumatic cylinder. In the particular relationship shown, the arm 53 is adapted to oscillate through an arc of approximately 72 degrees while that of the striker is approximately 120 degrees. The ratio of these gears also could be changed to vary the speed at which the striker travels and thereby provide variation in the component of force in a horizontal direction resulting from the striker impinging upon the glass while moving.

The hydraulic cylinder assembly 60 has a casing 61 pivotally mounted as at 62 to a member 63 which forms a further portion of the frame 11. The pivotal mounting 62 permits the lever 53 to travel through an arcuate path by allowing the cylinder to oscillate about such pivot. There are obvious other linkages which will permit this same type of drive.

Alternatively, the shaft 38 may be driven by an electric motor coupled thereto by a suitable clutch mechanism to provide the desired oscillatory motion of the shaft. Also, if desired, the shaft of the pneumatic cylinder may be secured directly to the shaft 38 through the intermediary of an arm projecting from the latter.

In operation, the sheet of glass G travels in the direction of arrow A on the conveyor 11 and at an appropriate moment when the groove 20 is located vertically above the anvil 12, the striker is actuated to contact the glass to provide a force P as indicated in FIG. 4. The striker travels through an arcuate path and provides a component of force (see FIG. 4) $F(x)$ which is parallel to the plane of the sheet of glass and a further component $F(y)$ which is perpendicular thereto. The component of force $F(x)$ tends to separate the leading edge A from the remaining portion of the glass sheet and thereby prevents further contact of the adjacent severed edges.

From FIG. 4, it will be evident that the resultant force $F(r)$ is in a direction obliquely disposed with respect to the plane of the glass and in a direction away from the anvil. The severed piece drops between the anvils 12 and 13 and is conveyed to a suitable disposal location by a conveyor or guide (not shown).

The sheet of glass G continues uninterrupted in its travel in the direction of arrow A and immediately upon arrival of the groove 21 vertically above the anvil 13, the striker strikes a blow on the trailing edge portion B by travelling in the direction Y. The striker, thus, provides a force on the trailing edge having a component $F(y)$ and a component $F(x)$ the latter being of reverse sense magnitude to that shown in FIG. 4. The component $F(x)$ again tends to separate the severed piece from the remaining portion of the sheet of glass.

From the foregoing, it will be evident that the striker oscillates between certain limits and to remove the leading edge, it travels in the direction indicated by the arrow X and to remove the trailing edge, it travels in the direction indicated by the arrow Y. To provide this component of force there is a certain frictional force between the striker surface, which engages the glass sheet, and the surface of the glass sheet. The surface of the striker has been indicated as being a resilient material and it will now be evident that it is desirable to have a cover wherein the co-efficient of friction between such material and the glass is relatively high. It will also be evident that the speed of oscillation of the striker may be varied to provide variations in the component of force $F(x)$.

In an alternative form, the arms 35, 36 and 37 may be made adjustable and thereby vary the position at which the striker engages the portion of glass to be severed in relation to the anvil. This position of striking the glass may also be varied by mounting the snapping assembly 10 on a suitable mechanism whereby it may be adjusted vertically.

I claim:
1. In a device having a support for conveying a sheet of glass along a selected path and an edge snapping device including an anvil engageable with one surface of said sheet, and a striker selectively engageable with the opposed surface thereof adjacent and to one side of said anvil, the improvement comprising a striker having alternately opposite directions of travel each disposed at an angle with respect to the plane of said sheet to strike in sequence a piece of glass to be severed respectively from opposite edges of said sheet, the direction of travel of the striker in each case being directed away from the sheet and the anvil thereby to separate the adjacent severed edges and means selectively effecting said directional movement of the striker.

2. An edge snapping device as defined in claim 1 wherein said striker consists of an elongated bar engageable with the glass sheet across substantially the entire width of the latter.

3. An edge snapping device as defined in claim 2 wherein said bar is mounted to oscillate about an axis parallel to the length thereof, the surface of said striker having a relatively high co-efficient of friction with respect to the surface of said glass sheet and engageable therewith alternately in opposite directions of the oscillatory motion thereof.

4. An edge snapping device as defined in claim 1 wherein said striker consists of an elongated bar having a rubber covered surface engageable with the surface of said glass across the width of the latter adjacent and to one side of a score line therein, said bar being mounted to swing in an arcuate path about an axis parallel to said score line and thereby provide said components of force normal and parallel to the plane of said sheet of glass.

5. A glass edge snapping device as defined in claim 1 wherein said support consists of a conveyor moving said sheet of glass continuously in a horizontal direction, the striker having components of force alternately in the direction of travel and in the direction opposite thereto upon engagement therewith in sequence first to remove the leading and then the trailing edge.

6. A glass snapping device comprising a conveyor for a sheet of glass having an upper and a lower surface for moving the same in a horizontal direction, whereby the sheet of glass presents a leading and a trailing edge, an anvil engageable with the lower surface of said sheet, a striker disposed vertically above said sheet and engageable with the upper surface thereof adjacent and horizontally to one side of said anvil and means selectively effecting engagement of said striker with said sheet of glass, said striker comprising a substantially elongated bar mounted for oscillation about a horizontal axis and disposed substantially normal to the direction of travel of said sheet of glass, said striker being engageable with the portion of said sheet of glass to be removed from the leading edge while moving in an arcuate path generally in the direction of travel of said sheet of glass and engageable with the portion to be removed from the trailing edge while moving through an arcuate path in a direction opposite thereto, said striker providing a force to remove the leading and trailing edge portions and having a component parallel to the plane of the sheet and directed away therefrom tending to separate the adjacent severed edges.

7. A glass snapping device as defined in claim 6 wherein said anvil consists of a roller in rolling engagement with the lower surface of said sheet of glass.

8. A glass snapping device as defined in claim 6 including a further anvil in spaced relation with respect to the first mentioned anvil, said striker being engageable with the upper surface of the sheet of glass at a position between said anvils.

9. The method of removing an edge portion from the leading and trailing edges of glass sheet having a score line in the surface adjacent each such edge to be removed while said sheet moves linearly past a glass edge snapping station comprising striking the leading edge portion a blow having a component of force in the direction of travel greater than the rate of travel for separating the adjacent severed edges and subsequently striking the trailing edge portion with a blow having a horizontal component of reverse direction for separating the latter severed edges.

10. A glass snapping device as defined in claim 6 including a further anvil disposed in spaced relationship with respect to the first-mentioned anvil, each of said anvils consisting of a roller in rolling engagement with the lower surface of the sheet of glass, said striker being engageable with the upper surface of the sheet of glass at a position between said anvils and alternately adjacent respective ones thereof.

References Cited by the Examiner

UNITED STATES PATENTS 3,142,427    7/1964    Brand _____ 225—104

FOREIGN PATENTS 663,910    4/1929    France.
1,314,389    12/1962    France.
197,937    9/1924    Great Britain.
262,122    4/1927    Great Britain.

ANDREW R. JUHASZ, *Primary Examiner.*

J. M. MEISTER, *Assistant Examiner.*